United States Patent
Ford et al.

[11] Patent Number: 6,143,175
[45] Date of Patent: Nov. 7, 2000

[54] INJECTION OF A SOLIDS-LADEN WATER STREAM INTO A CENTRIFUGAL SEPARATOR

[75] Inventors: Steven D. Ford, Clovis; Emmanuel G. Moya, Fresno; Thomas Lisy; Robert Garcia, both of Clovis, all of Calif.

[73] Assignee: Claude Laval Corporation, Fresno, Calif.

[21] Appl. No.: 09/322,139

[22] Filed: May 28, 1999

[51] Int. Cl.$^7$ ................................................ B01D 21/26
[52] U.S. Cl. .................... 210/512.1; 209/715; 209/723; 209/725; 209/727; 209/733; 96/188; 96/212; 55/459.1; 55/459.4
[58] Field of Search .................. 55/459.1, 459.2, 55/459.3, 459.4, 459.5; 96/182, 212; 209/715, 723, 725, 727, 733; 210/512.1, 788

[56] References Cited

U.S. PATENT DOCUMENTS

| | | | |
|---|---|---|---|
| 3,512,651 | 5/1970 | Laval, Jr. | 210/512.1 |
| 4,072,481 | 2/1978 | Laval, Jr. | 96/182 |

*Primary Examiner*—David A. Reifsnyder
*Attorney, Agent, or Firm*—Donald D. Mon

[57] ABSTRACT

A centrifugal separator comprising a separation barrel with an upper end, a lower end, a central axis, and an internal circularly cylindrical axially extending wall forming a separation chamber, a collection chamber adjacent to the lower end, a spin plate extending across the separation chamber adjacent to the lower end, a solids slot adjacent to the lower end fluidly interconnecting the collection chamber and separation chamber, a closure containing the upper end having a centrally located exit port, an acceptance chamber wall surrounding the separation barrel adjacent to the upper end to form an annular acceptance chamber between the separation barrel and the acceptance chamber wall, a supply nozzle tangentially entering the annular acceptance chamber and forming a circular flow therein, and a plurality of radially spaced apart axially-extending slots passing through the wall of the separation barrel fluidly interconnecting the annular acceptance chamber and the separation chamber, entering the separation chamber tangentially in the same rotational direction as the rotational direction in the acceptance chamber, each of the slots having an upper end and a lower end; the slots being formed in a plurality of axially-disposed ranks, each rank including a plurality of equally angularly spaced apart slots, the upper ends of the slots in each lower rank having an elevation not appreciably higher than the lower ends of the slots in the rank just above it, the slots being formed in a staggered pattern.

5 Claims, 2 Drawing Sheets

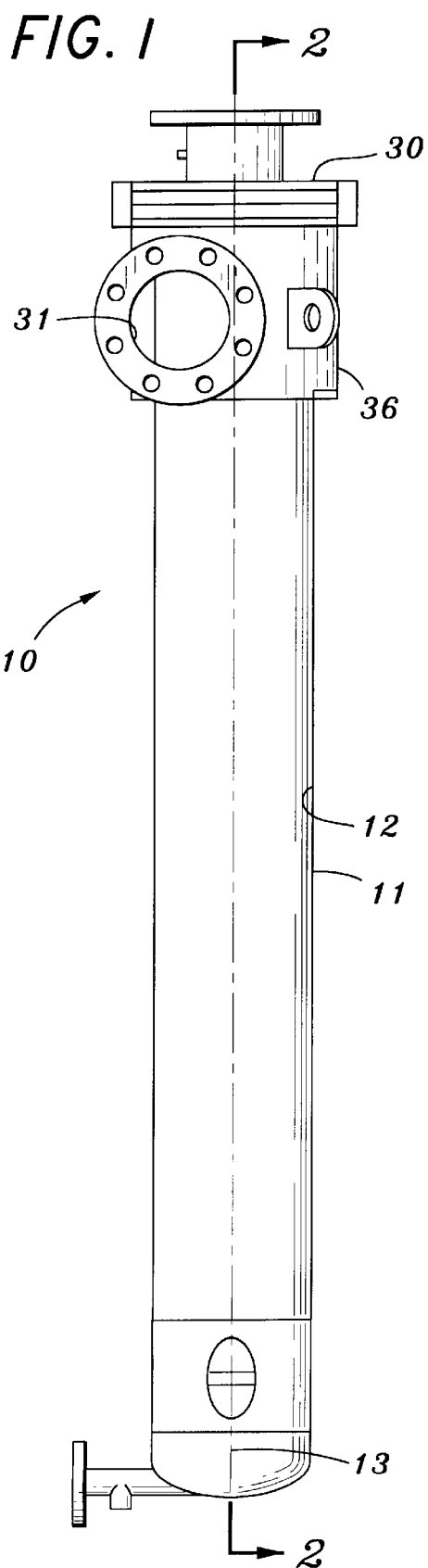
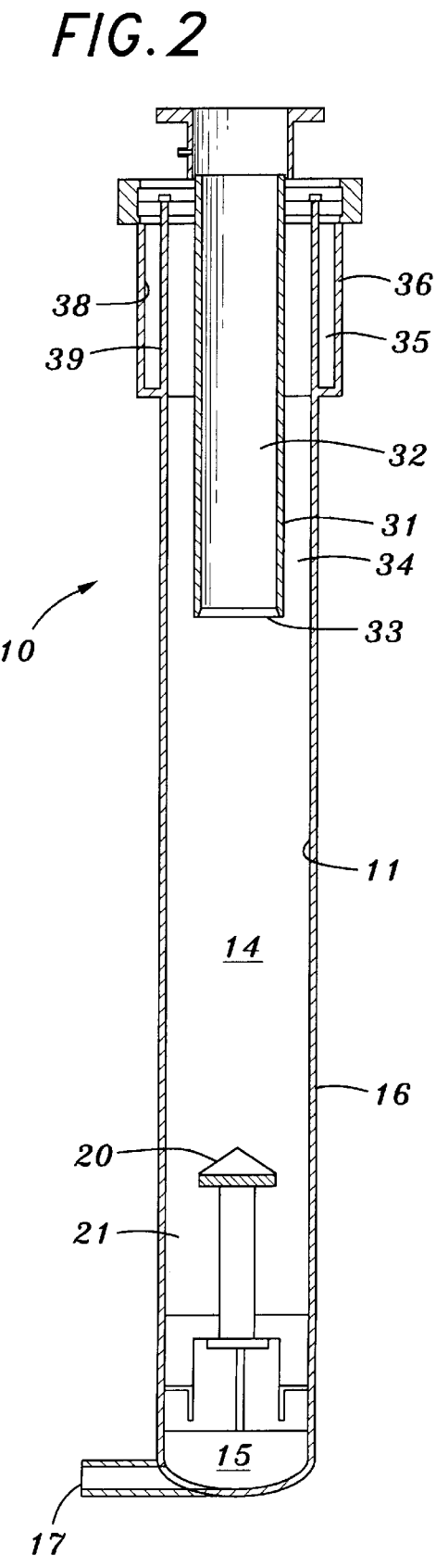

INJECTION OF A SOLIDS-LADEN WATER STREAM INTO A CENTRIFUGAL SEPARATOR

FIELD OF THE INVENTION

Improved injection of a solid-laden water stream into a centrifugal separator, through entrance slot configurations that discipline the entering stream of solids-laden liquid into the separation barrel of the centrifugal separator.

BACKGROUND OF THE INVENTION

Centrifugal separators are widely used as a means to separate solids from flowing streams of water in which they are entrained. The classical arrangement is to inject the stream from a nozzle tangentially into a cylindrical separation barrel. As the stream whirls around the wall of the separation barrel, the high g forces within the stream cause the solid particles to migrate toward the wall as the whirling stream flows from an upper elevation to a lower elevation in the separation barrel. At or near a lower end of the separation barrel there is a spin plate which reflects the central portion of the tubularly shaped whirling stream upwardly toward a central exit port. This central portion of the stream is substantially free from solids in a properly designed and properly operated centrifugal separator.

There is a slot near the spin plate either through or at the lower end of the separation barrel through which the solids that are nearer the wall of the separator barrel will pass. These solids formed part of the outer portion of the stream which is contiguous to the wall.

This type of centrifugal separator is shown in Laval Jr. U.S. Pat. No. 4,072,481 which is incorporated herein by reference in its entirety for its showing of the theory and practice of such separators.

Devices of this type are frequently used to separate solid particles over a large range of sizes. Apparatus using this principle extend in sizes from as small as parts cleaners for use in automobile service bays, through large factory installations for separating crop washings and floor sweepings from wash water, to removal of grit from very large water distribution and irrigation systems.

This is a passive system whose function and efficiency are in large part derived from the velocity and smoothness of flow of the stream in the separator. Turbulence anywhere in the system, or inefficiency in the introduction of the stream into the separation barrel, will result in the need for more power (higher injection pressure), or a reduction in efficiency of separation.

A further problem arises from the abrasive nature of the solids themselves. In order to generate the substantial g forces, required, the velocity of the particles and the force of their contact with parts of the separator will result in a substantial wear rate that can only partially be compensated for by the use of steel alloys. This is especially the situation at the edges of slots through which the solids-laden water passes from an acceptance chamber when it enters the separation chamber. Non-turbulent smooth flow results in reduced wear throughout the entire system.

It follows that reduction of turbulence, and disciplining of the stream can importantly improve separation, reduce power cost, extend the time between repairs, and extend the useful life of the device. It is an object of this invention to provide such improvements.

BRIEF DESCRIPTION OF THE INVENTION

A centrifugal separator that incorporates this invention includes a separator barrel. This barrel has a cylindrical internal wall which forms an axially-extending separation chamber. The stream is injected tangentially into the separation chamber at an upper elevation. It swirls down the wall in a helical pattern to a lower elevation where it encounters a central spin plate. There is a slot between the spin plate and the wall through which the solids can escape to a lower collection chamber.

In accordance with known principles, the spin plate causes the central portion of the whirling stream to reverse its rotational sense and axial direction, and flow upwardly to an outlet port at the top of the separation chamber.

A peripheral acceptance chamber which surrounds the separation barrel near its top receives the solids-laden stream for introduction into the separation chamber. In this chamber the solids-laden stream to be treated gathers, and is injected from it into the separation chamber through nozzle orifices to impart a centrifugal motion to the stream against the wall of the separation chamber.

According to this invention the acceptance chamber has an axial length with an upper and a lower end. According to this invention the slots have an axial component of length, with respective upper and lower ends, and a width. This forms a slotted nozzle which discharges tangentially onto the separation chamber wall.

According to this invention, the slots are arranged in a plurality of ranks, viewed axially. Preferably there are two ranks, an upper rank and a lower rank. While these might overlap by a minor amount, the preferred construction is for the upper end of the slots in the lower rank to be no higher than the lower end of the slots in the upper rank.

There is a plurality of slots in each of these ranks, arranged in a peripheral file along which they are angularly spaced apart from one another.

According to a preferred but optional feature of the invention, the slots of the upper and lower rank are angularly spaced apart from one another to form a staggered pattern.

Although the slots may and often will be parallel to the axis of the separation chamber, according to yet another preferred but optional feature of the invention the slots are slanted so as to form a fragment of a helix, descending as it extends in the direction of water flow into the separation barrel.

The above and other features of this invention will be fully understood from the following detailed description and the accompanying drawings, in which:

BRIEF DESCRIPTION OF THE DRAWINGS

FIG. 1 is a side elevation of the presently-preferred embodiment of the invention;

FIG. 2 is an axial cross-section taken at line 2—2 in FIG. 1;

DETAILED DESCRIPTION OF THE INVENTION

Figure 3:
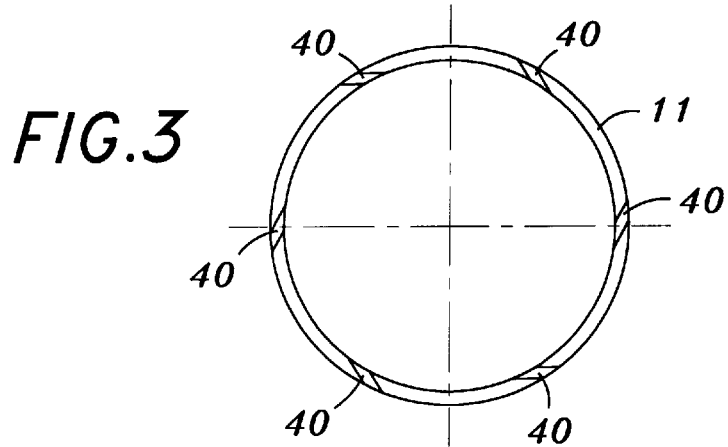
FIG. 3 is a lateral section of the upper portion of the separation barrel.

A centrifugal separator 10 in which this invention is used is shown in FIGS. 1 and 2. Its basic functional element is a separation barrel 11 which has a circularly cylindrical wall 12 extending along a central axis 13. It forms a separation chamber 14.

A collection chamber 15 joins barrel 11 adjacent to its lower end 16 and extends beneath it to collect separated solids, or a flow of liquid which is much-enriched in solids. A drain port 17 at the bottom end of the collection chamber enables the solids and some liquids to be drawn from it, either continuously or from time to time. A removable plug may be provided for this purpose. In another arrangement, a continuous drain can be provided for this purpose. One such drain is shown in Haslup U.S. Pat. No. 5,571,416. The method or means to remove solids forms no part of this invention.

At or near the lower end of the separation barrel there is a spin plate 20 which extends normal to the central axis across the barrel. A slot 21 is left between the spin plate and the barrel, If preferred, the spin plate could close the end of the barrel, and a slot could be cut in the barrel wall. This illustrated spin plate is in fact conical, but a flat plate can be used instead.

It is simpler and less expensive to leave a gap between the plate and the end of the barrel to form the slot, as shown. The slot fluidly interconnects the separation chamber 14 defined by the barrel to collection chamber 15.

A top closure 30 at the upper end of the separation barrel includes an exit tube 31 with a central passage 32 for exit of treated water. This tube extends to a lower open end 33 into which the water reflected upwardly by the spin plate flows. The annular region 34 between the exit tube and the wall of the separation barrel receives the solids-laden stream. The outer wall of exit tube 31 serves to restrain the stream as it enters the separation barrel, and separates it from the upward central flow of treated water.

An acceptance chamber 35 is formed by a shell 36 around the upper end of the separation barrel. The shell is annularly-shaped and fits around and in fluid-sealing relationship with the separation barrel. An injector nozzle 37 through the wall of the shell is directed tangentially into the acceptance chamber. It receives a solid-laden liquid stream under pressure, and injects it into the acceptance chamber. This creates a circular flow between wall 38 of the shell and outer wall 39 of the separation barrel. Entrance slots 40 through the wall of the separation barrel pass the stream from the acceptance chamber into the separation barrel.

The use of entrance slots which extend axially in the acceptance chamber in a circumferential array of slots of equal length and axial location is known and in current use. It does provide good separation of solids and liquids with reasonable energy cost. However, the improvements of this invention provide substantially improved results by providing different arrays and shapes of entrance slots. The reasons for the improvement in function are themselves surprising.

The separation of solids from liquids is derived from fields of g force. If the solids/liquid stream treated by this invention were permitted to stand still for a sufficient length of time, the solids of sizes greater than colloidal would ultimately settle out. Heavier particles would separate quickly-faster than the finer particles. Even in a swiftly moving stream, gravity forces are effective for the separation of the particles from the liquid and for the segregation of sizes as they separate.

Similar separations are attained when the forces are other than gravity forces in a still environment. In particular, the very large centrifugal forces which are exerted in a centrifugal separation chamber cause much faster separation, more efficiently.

The stream is injected into the separation barrel at a high velocity, and whirls as a swiftly flowing helically moving stream from its upper end to its lower end. In the separation barrel, the centrifugal forces are much greater than the gravitational force. The smaller the diameter, the greater the centrifugal force becomes for the same linear speed along the inner surface of the barrel.

The situation and the objective in the acceptance chamber are similar, but differ in some important aspects. For one, separation of particles is not desired in the acceptance chamber. It is a closed chamber except for the slots, and all water and all solids must ultimately flow through the slots. Thus all solids are intended to be discharged from the acceptance chamber into the separation chamber. With this in mind it has been customary when an acceptance chamber is used to extend the slots for nearly its entire axial length, leaving little or no chamber volume in which solids could be trapped.

Some centrifugal separators do not include acceptance chambers. Instead a nozzle or nozzles directly inject the stream tangentially into the separation barrel. This of course eliminates any problems caused by an acceptance chamber, but forfeits the considerable potential advantages of such a chamber.

The advantage of utilizing tangentially-directed slots of substantial length is their disciplining of the stream into a sheet form at the moment it enters the separation chamber. Injection from a nozzle with some other cross-section provides a stream which must be flattened to a sheet form while in the separation chamber. This takes time. While the time to do this is concededly short, so is the dwell time of the stream along the wall of the separation barrel, which usually is only a few seconds at most.

A sheet like stream is best produced from a non-turbulent source in the acceptance chamber, so as to produce a stream whose particles have as little velocity angularly to the stream direction as possible. Thus turbulence in the acceptance chamber should be avoided. This is done with this invention by providing entrance slots in the patterns described, wherein there is less competition between the larger and smaller particles for entrance into the slots. Such competition can create turbulence, decrease the freedom of flow through the slots, and increase wear on the separator. This competition increases power requirements, impedes the formation of a smooth non-turbulent stream, and requires more maintenance. These are avoided or minimized with this invention.

The above disadvantages principally arise from the tendency of the larger particles to migrate toward the lower end of the acceptance chamber under gravity forces than the smaller particles while both are in the acceptance chamber. It is surprising that such segregation occurs in a ring-shaped chamber in which the circumferential velocity is relatively high, but it does. As a consequence, there is a competition between the larger and smaller particles for entering into the slots.

By providing slots which have their lower ends at different axial elevations, and especially by staggering these slots, one is able to compensate for the skewed distribution of solids after they enter the acceptance chamber that is inherently caused by gravitational forces. Typically, upon entering the acceptance chamber, the heavier solids promptly tend to flow downward to the bottom of the chamber while the finer, lighter solids become more prevalent in the upper portion. In effect, the acceptance chamber begins to classify the solids by size and weight—of something of a pre-separation. By having all the slots in a single line, the small and large particles are forced to coexist in the same stream through the same slots. This has been shown to interfere with efficient separation. The larger particles dominate the flow field, forcing the smaller particles to "get out of the way" and impede their entry into a slot. By having essentially a location for smaller particles to enter the separation barrel through a higher rank of slots, separately from the larger particles, the smaller particles need not fight the larger particles or each other for entry into any slot.

Also, because the finer solids will enter a slot located higher in the separation barrel, they are forced to spin a few more times than the larger solids which enter slots in the lower rank before they reach the outlet of the separator. This is exactly what is desired, because it offers the finer solids more opportunity to be separated by being exposed to g forces for a longer period of time than the heavier solids.

Accordingly, the use of slots in multiple ranks provides an arrangement in which slots are uniquely disposed to accept the sizes likeliest to be at that axial location. This enables the respective sizes to leave the acceptance chamber quickly. It also reduces abrasion on the walls of the device because there is less turbulence and faster exit through the slots. This in turn extends the time between repairs or services, and reduces the operating cost of the equipment.

Slots for this device may conveniently be laser-cut so as to provide a slot which at all of its elevations are directed tangentially onto the inside wall of the separation chamber. In a convenient construction shown in FIG. 4, there will be two ranks, an upper rank 51 with slots 52 and a lower rank 53 with slots 54. Each rank has six individual slots in a circumferential file, although only one is shown in each rank for convenience in disclosure. The slots are "staggered" in the sense that the lower ends of the slots in the upper rank are equally spaced between the upper ends of the slots in the lower rank.

Figure 4:
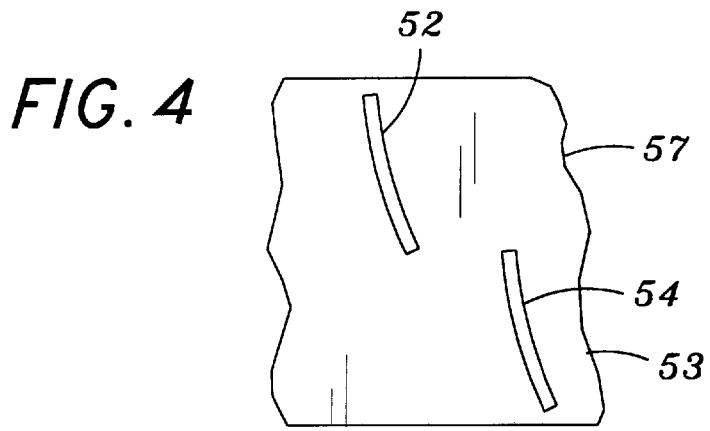
FIG. 4 is a laid-out fragmentary view of the presently-preferred slot pattern.

The slots may and sometimes will be parallel to the axis. However, it is a significant improvement for the slots to slant downward at an angle to an axial line on the surface of the wall of the separation chamber. The angle is preferably about 20 degrees, but provides improvements at any angle up to about 45 degrees. A flat laid-out pattern is shown in FIG. 4.

Figure 5:
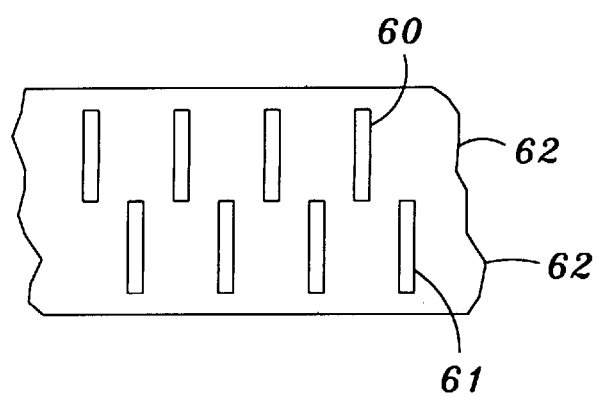
FIG. 5 is a laid-out fragmentary view of an alternate slot pattern.

Alternatively, as shown in FIG. 5, slots 60 and 61 may be provided in upper and lower ranks 62, 63, respectively, and are parallel to the axis. In all embodiments, the slot walls will be set at an angle to discharge the stream tangentially out the wall of the separation chamber.

In a separation barrel having a length of about 64 inches and a diameter of about 7 inches diameter, slanted slots having an axial length of about 5¾ inches, with their upper and lower ends offset by about 1½ inches, six in number for each rank has proved to be very effective. They will usually be about ⅜ inches wide. Straight slots as shown in FIG. 5 will have about the same axial height and number. Other dimensions may be varied as desired, or scaled from the drawings.

This invention is not to be limited by the embodiments shown in the drawings and described in the description, which are given by way of example and not of limitation, but only in accordance with the scope of the appended claims.

We claim:

1. In a centrifugal separator having a separation barrel with an upper end, a lower end, a central axis, and an internal circularly cylindrical axially extending wall forming a separation chamber, a collection chamber adjacent to said lower end, a spin plate extending across said separation chamber adjacent to said lower end, a solids slot adjacent to said lower end fluidly interconnecting said collection chamber and separation chamber, a closure containing said upper end having a centrally located exit port, an acceptance chamber wall surrounding said separation barrel adjacent to said upper end to form an annular acceptance chamber between said separation barrel and said acceptance chamber wall, a supply nozzle tangentially entering said annular acceptance chamber and forming a circular flow therein, and a plurality of radially spaced apart axially-extending slots passing through the wall of the separation barrel fluidly interconnecting said annular acceptance chamber and said separation chamber, entering said separation chamber tangentially in the same rotational direction as the rotational direction in said acceptance chamber, each of said slots having an upper end and a lower end, the improvement comprising:

said slots being formed in a plurality of axially-disposed ranks, each rank including a plurality of equally angularly spaced apart slots, the upper ends of the slots in each lower rank having an elevation not appreciably higher than the lower ends of the slots in the rank just above it, said slots being formed in a staggered pattern.

2. Apparatus according to claim 1 in which there are two such ranks, all of said slots being equally angularly spaced from one another.

3. Apparatus according to claim 1 in which each of said slots is parallel to said axis.

4. Apparatus according to claim 1 in which each of said slots extend in a helical direction relative to said central axis.

5. Apparatus according to claim 4 in which there are two such ranks, each with six of said slots, all of said slots being equally angularly spaced from one another.

* * * * *